(12) United States Patent
Watson et al.

(10) Patent No.: US 11,313,322 B2
(45) Date of Patent: Apr. 26, 2022

(54) EXHAUST NOZZLE ASSEMBLY

(71) Applicant: ROLLS-ROYCE plc, London (GB)

(72) Inventors: Jonathan V. Watson, Bristol (GB); Conor Hickey, Bristol (GB)

(73) Assignee: ROLLS-ROYCE plc, London (GB)

( * ) Notice: Subject to any disclaimer, the term of this patent is extended or adjusted under 35 U.S.C. 154(b) by 298 days.

(21) Appl. No.: 16/446,690

(22) Filed: Jun. 20, 2019

(65) Prior Publication Data

US 2020/0025133 A1 Jan. 23, 2020

(30) Foreign Application Priority Data

Jul. 19, 2018 (GB) ...................................... 1811780

(51) Int. Cl.
*F02K 1/46* (2006.01)
*F02K 1/06* (2006.01)

(52) U.S. Cl.
CPC . *F02K 1/46* (2013.01); *F02K 1/06* (2013.01)

(58) Field of Classification Search
CPC ..... F02K 1/06; F02K 1/08; F02K 1/46; F02K 3/075
See application file for complete search history.

(56) References Cited

U.S. PATENT DOCUMENTS

| | | | |
|---|---|---|---|
| 2005/0235628 A1 | 10/2005 | Senile | |
| 2008/0022690 A1 | 1/2008 | Chanez et al. | |
| 2009/0158704 A1 | 6/2009 | Whurr et al. | |
| 2012/0192543 A1 | 8/2012 | Aeberli et al. | |
| 2016/0010590 A1* | 1/2016 | Rolt | F02K 1/08 60/805 |

FOREIGN PATENT DOCUMENTS

| | | |
|---|---|---|
| JP | H07-208262 A | 8/1995 |
| JP | H07-208263 A | 8/1995 |
| JP | 3332057 B2 | 10/2002 |
| WO | 96/12881 A1 | 5/1996 |
| WO | 2007/093760 A1 | 8/2007 |

OTHER PUBLICATIONS

Jan. 8, 2020 Extended European Search Report issued in European Patent Application No. 19181190.0.
Jan. 14, 2019 British Search Report issued in British Patent Application No. 1811780.4.

* cited by examiner

*Primary Examiner* — Andrew H Nguyen
(74) *Attorney, Agent, or Firm* — Oliff PLC

(57) ABSTRACT

An exhaust nozzle assembly for a gas turbine engine. The assembly includes concentrically arranged inner mixer and outer exhaust nozzles, the exhaust nozzle extending axially downstream of said mixer nozzle. A centre-body is axially mounted within and extends axially downstream from the mixer nozzle. A core flow duct is defined by the mixer nozzle and the centre-body, the core flow duct having a core exit area. An exhaust duct is defined at least in part by the exhaust nozzle downstream of the mixer nozzle, the exhaust duct having an exhaust exit area. The mixer nozzle includes a mixer cowl which is axially-translatable along the centre axis and the exhaust nozzle includes an exhaust cowl which is either axially-translatable along or angularly-adjustable relative to the centre axis. The assembly further includes an actuation mechanism and the mixer cowl and exhaust cowl are movable by the actuation mechanism.

19 Claims, 6 Drawing Sheets

EXHAUST NOZZLE ASSEMBLY

CROSS-REFERENCE TO RELATED APPLICATIONS

This specification is based upon and claims the benefit of priority from United Kingdom patent application number GB 1811780.4 filed on Jul. 19, 2018, the entire contents of which are incorporated herein by reference.

BACKGROUND

Field of the Disclosure

The present invention relates to a variable exhaust area nozzle assembly for a gas turbine engine such as a gas turbine engine for use on a supersonic aircraft.

Description of the Related Art

There is a growing interest in the development of supersonic aircrafts for civil use. In particular, gas turbine engine systems that effectively provide thrust in subsonic, transonic and supersonic flight regimes, with reduced noise output during certain operations, are of interest.

A gas turbine typically comprises, in axial flow series, an air intake, a propulsive fan, an intermediate pressure compressor, a high-pressure compressor, combustion equipment, a high-pressure turbine, an intermediate pressure turbine, a low-pressure turbine and an exhaust nozzle. A nacelle generally surrounds the engine and defines both the intake and the exhaust nozzle.

Air entering the intake is accelerated by the fan to produce two air flows: a core flow into the intermediate pressure compressor and a bypass flow which passes through a bypass passage to provide propulsive thrust. The intermediate pressure compressor compresses the air flow directed into it before delivering that air to the high pressure compressor where further compression takes place.

The compressed air exhausted from the high-pressure compressor is directed into the combustion equipment where it is mixed with fuel and the mixture combusted. The resultant hot combustion products then expand through, and thereby drive the high, intermediate and low-pressure turbines before being exhausted through the nozzle to provide propulsive thrust.

Mixed turbofans combine the (hot) core and (cooler) bypass flows upstream of the nozzle to gain thrust from the combining of two streams of different temperatures. The axial location of the point at which the two streams are brought into contact, thereby starting the mixing process, is termed the mixing plane. A mixer nozzle is typically provided with an outlet at the mixing plane. A number of different types of mixer nozzles are known. For example, the mixer nozzle may comprise a series of lobes, chutes or serrations to promote mixing between the core flow and bypass flow.

Varying the area ratio of the core and bypass flows at the mixing plane and varying the area of the final exhaust nozzle produces a number of potential advantages to the engine's thermodynamic cycle in terms of performance and acoustics.

For example, by using a maximum final exhaust nozzle area and maximum core flow area at the mixing plane during take-off, the engine is able to operate at maximum flow capacity which reduces the specific thrust and jet velocity and thus reduces engine noise (which is strongly linked to jet velocity).

In contrast, fuel efficiency under cruise conditions (and thus cruise range) is maximised by reducing the final exhaust nozzle area and reducing the core flow area to increase the specific thrust and jet velocity.

The present disclosure aims to provide an exhaust nozzle assembly capable of varying the core exit area and final exhaust exit area without adding significant weight, complexity and cost to the engine manufacture and operation.

SUMMARY OF THE DISCLOSURE

According to a first aspect there is provided an exhaust nozzle assembly for a gas turbine engine having a centre axis, said assembly comprising:
concentrically arranged inner mixer and outer exhaust nozzles, the exhaust nozzle extending axially downstream of said mixer nozzle,
a centre-body axially mounted within and extending axially downstream from the mixer nozzle;
a core flow duct defined by the mixer nozzle and the centre-body, the core flow duct having a core exit area;
an exhaust duct defined at least in part by the exhaust nozzle downstream of the mixer nozzle, the exhaust duct having an exhaust exit area; and
an actuation mechanism;
wherein the mixer nozzle comprises a mixer cowl which defines the core exit area and is axially-translatable along the centre axis and wherein the exhaust nozzle comprises an exhaust cowl which defines the exhaust exit area and is either axially-translatable along or angularly-adjustable relative to the centre axis; and
wherein the mixer cowl and exhaust cowl are movable by the actuation mechanism between a first position in which the core exit area and exhaust exit area are maximum and a second position in which the core exit area and exhaust exit area are minimum.

By providing mixer and exhaust cowls that are movable relative to the centre axis and thus movable relative to the fixed centre-body, the core exit area and exhaust exit area are adjustable in unison between a first (maximum area) position which is optimised for take-off and a second (minimum area) position which is optimised for cruise conditions. The single actuation mechanism reduces engine complexity, weight and thus cost compared to known systems with separate actuation of the mixer and exhaust nozzles. Furthermore, actuation to effect translation/adjustment of the cowls allows positioning of the actuation mechanism outside of the hot engine core meaning that the temperatures to which the actuation mechanism is exposed are reduced. Positioning of the actuators outside of the engine core also allows easier access to the actuation mechanism e.g. for plumbing purposes and for maintenance.

In some embodiments, the mixer cowl comprises a mounting portion and convergent portion converging from the mounting portion. The downstream extremity of the mixer cowl defines the outer periphery of the core exit area (at the mixing plane). In some embodiments, the mounting portion is a parallel (cylindrical) portion which is slidably mounted on a static engine core structure within the mixer nozzle.

In some embodiments, the mixer nozzle is a lobed mixer nozzle or a forced chuted mixer nozzle and the axially-translatable mixer cowl (e.g. the convergent portion of the mixer cowl) comprises lobes/chutes to assist in intermixing between the core (hot) flow and the bypass (cooler) flow at the mixing plane. In other embodiments, the mixer cowl (e.g. the convergent portion of the mixer cowl) may be an annular or frustoconical cowl.

In embodiments where the exhaust nozzle comprises an axially-translatable exhaust cowl, the exhaust cowl may comprise a mounting portion and convergent portion converging from the mounting portion. The downstream extremity of the exhaust cowl defines the outer periphery of the exhaust exit area. In some embodiments, the mounting portion is a parallel (cylindrical) portion which is slidably mounted on the nacelle surrounding the engine.

The centre-body comprises an axial variation in its diameter/radial cross-section i.e. the diameter/radial cross-section varies from its upstream end to its downstream end.

The term "upstream" is used to indicate a direction towards the fan and the term "downstream" is used to indicate a direction towards the exhaust nozzle.

In some embodiments, the centre-body comprises, in an axial downstream direction, a waist portion and a head portion, the waist portion having a smaller diameter than the head portion. The waist portion may be a parallel (cylindrical) portion. The head portion comprises in an axial downstream direction, a diverging portion (diverging from the waist portion) and a converging end portion (which may be a conical end portion). The plane of deflection between the diverging and converging head portions will be the maximum diameter portion of the head portion.

In some embodiments, the waist portion may be mounted to a static engine core structure.

In other embodiments, the centre-body may further comprise an axially upstream convergent portion which may converge to the waist portion from an axially upstream mounting portion which may be a parallel portion. The mounting portion is mounted to a static engine core structure.

In some embodiments, the centre-body extends downstream from the mixer nozzle through the exhaust nozzle. In these embodiment's, the exhaust duct is defined by the exit nozzle and the centre-body. In other embodiments, the centre-body extends downstream from the mixer nozzle by terminates with its converging downstream end within the exhaust duct upstream of the exhaust exit area.

In some embodiments, the first position of the axially-translatable mixer and exhaust cowls is a downstream position with the cowls extended in a downstream direction (away from the engine fan). In these embodiments, the second position of the axially-translatable mixer and exhaust cowls is an upstream position with the cowls retracted in an upstream direction (towards the engine fan).

In these embodiments (with axially-translatable mixer and exhaust cowls), in the first (downstream) position, the core exit area (i.e. the mixing plane) may be axially aligned with the centre-body at a portion having a diameter less than the maximum diameter of the head portion of the centre-body. For example, it may be aligned with the waist portion of the centre-body or may be aligned proximal to the waist portion e.g. with the converging portion upstream of the waist portion. In the first position, the exhaust exit area may be axially aligned with the head portion of the centre-body at a portion having a diameter less than the maximum diameter of the head portion e.g. with the converging (conical) end portion of the head portion of the centre-body. It may be axially aligned with the converging end portion proximal the downstream extremity of the centre-body. In this way, the core exit and exhaust exit areas are maximised since the radial surface area of the centre-body in each area is reduced/minimised.

In these embodiments (with axially-translatable mixer and exhaust cowls), in the second (upstream) position, the core exit area may be axially aligned with the centre-body at a portion having a diameter greater than the minimum diameter of the centre-body e.g. it may be aligned with the mounting portion of the centre-body or may be aligned with the converging portion downstream of (e.g. proximal to) the mounting portion. In the second position, the exhaust exit area may be axially aligned with the head portion at a position having a greater diameter than in the first position e.g. it may be axially aligned with or proximal to the deflection between the diverging and converging head portion where the head portion has the maximum diameter. In this way, the core exit and exhaust exit areas are minimised since the diameter/radial surface area of the centre-body in each area is increased/maximised.

In embodiments having an axially-translatable mixer cowl and an angularly-adjustable exhaust cowl, the first position of the axially-translatable mixer cowl is a downstream position with the cowl extended in a downstream direction (away from the engine fan). In these embodiments, the second position of the axially-translatable mixer cowl is an upstream position with the cowl retracted in an upstream direction (towards the engine fan). In these embodiments, the axial position of the exhaust cowl is fixed relative to the centre-body but the angle the cowl makes relative to the centre axis is adjustable.

In these embodiments (with an axially-translatable mixer cowl and angularly-adjustable exhaust cowl), in the first (downstream) position, the core exit area may be axially aligned with the centre-body at a portion having a diameter less than the maximum diameter of the/head portion centre-body, e.g. it may be aligned at the converging portion of the head portion of the centre-body proximal the downstream extremity of the centre-body. In this way, the core exit area is maximised since the radial surface area of the centre-body is reduced/minimised.

In these embodiments (with axially-translatable mixer cowl and angularly-adjustable exhaust cowl), in the second (upstream) position, the core exit area may be axially aligned with the centre-body at a portion having a greater diameter than the minimum diameter of the centre-body/head portion e.g. it may be aligned with the converging portion of the head portion of the centre-body at or proximal to the deflection between the diverging and converging head portion where the head portion has the maximum diameter. In this way, the core exit area is minimised since the diameter/radial surface area of the centre-body is increased/maximised.

In the first position, the exhaust cowl is angularly adjusted to increase the exhaust exit area and in the second position the exhaust cowl is angularly adjusted to decrease the exhaust exit area.

For example, the exhaust cowl may comprise a series of circumferentially-arranged cowl petals, each cowl petal having a fixed upstream end and a free downstream end wherein the free ends can pivot/hinge about their respective fixed ends to adjust the angle each cowl petal makes relative to the engine axis. In the first position, the free-ends move away from the centre axis, such that the angle between each cowl petal and the centre axis decreases and the exhaust exit area increases. In the second position, the free-ends are pivoted towards the centre axis, such that the angle between each cowl petal and the centre axis increases and the exhaust exit area decreases.

The actuator mechanism acts to move/adjust both the mixer and exhaust cowls in unison between the first and second positions. It may be provided externally to the engine core thus reducing the temperatures to which the actuator is exposed and allowing easier access for plumbing and maintenance.

The actuator mechanism may comprise at least one actuator mounted within and to the static engine core structure. There may be a plurality of circumferentially arranged actuators. The or each actuator may comprise a linear actuator e.g. a piston. The or each actuator may be a hydraulic, pneumatic or electronic actuator.

The actuator mechanism e.g. the or each actuator/piston may comprise at least one axial linkage/shaft extending between and operatively coupling the mixer cowl and exhaust cowl such that axial translation of the axial linkage/shaft by the actuator(s) results in axial translation of the mixer cowl and either axial translation or angular adjustment of the exhaust cowl.

The actuation mechanism may comprise a radial linkage extending from the or each axial linkage/shaft to the mixer cowl in order to transfer the axial motion of the axial linkage/shaft to the mixer cowl.

In embodiments comprising an axially-translatable exhaust cowl, the actuation mechanism may further comprise a downstream radial linkage extending from the or each axial linkage/shaft to the exhaust cowl in order to transfer the axial motion of the axial linkage/shaft to the exhaust cowl.

In embodiments comprising an angularly-adjustable exhaust cowl, the actuation mechanism may comprise one or more rollers each seated on a respective radially outer cam surface of the exhaust cowl. The or each roller may be connected directly or indirectly to a respective one of the axial linkages/shafts. For example, a plurality of rollers may be coupled to a unison ring surrounding the radially outer surface of the exhaust cowl, the unison ring being connected to one or more axial linkages.

In embodiments where the exhaust cowl comprises a plurality of cowl petals, there may be a plurality of rollers, each roller associated with one of the cowl petals. Each petal associated with a roller may have a cam surface on its radially outer surface so that when a roller is in an upstream (second) position on the respective cam surface, the free end of the cowl petal is forced towards the centre axis of the engine thus reducing the exhaust exit area.

Actuation of the actuation mechanism causes the roller(s) to move over/down the cam surface to a downstream (first) position to allow the free end of the associated cowl petal to move away from the engine centre axis thus increasing the area of the exhaust exit area.

The unison ring ensure that all cowl petals associated with a roller move to the same extent at the same time i.e. move in unison. It also allows the number of actuators/pistons to be lower than the number of rollers.

In some embodiments, the nozzle assembly further comprises a divergent section downstream of the exhaust nozzle/exhaust exit area. This divergent section may have a fixed or variable geometry. Where the divergent section is of variable geometry, it may be operably coupled to the actuator mechanism or it may be actuated by a second, separate actuation mechanism.

In a second aspect, there is provided a gas turbine engine having an exhaust nozzle assembly according to the first aspect.

In a third aspect, there is provided a supersonic aircraft having a gas turbine engine according to the second aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
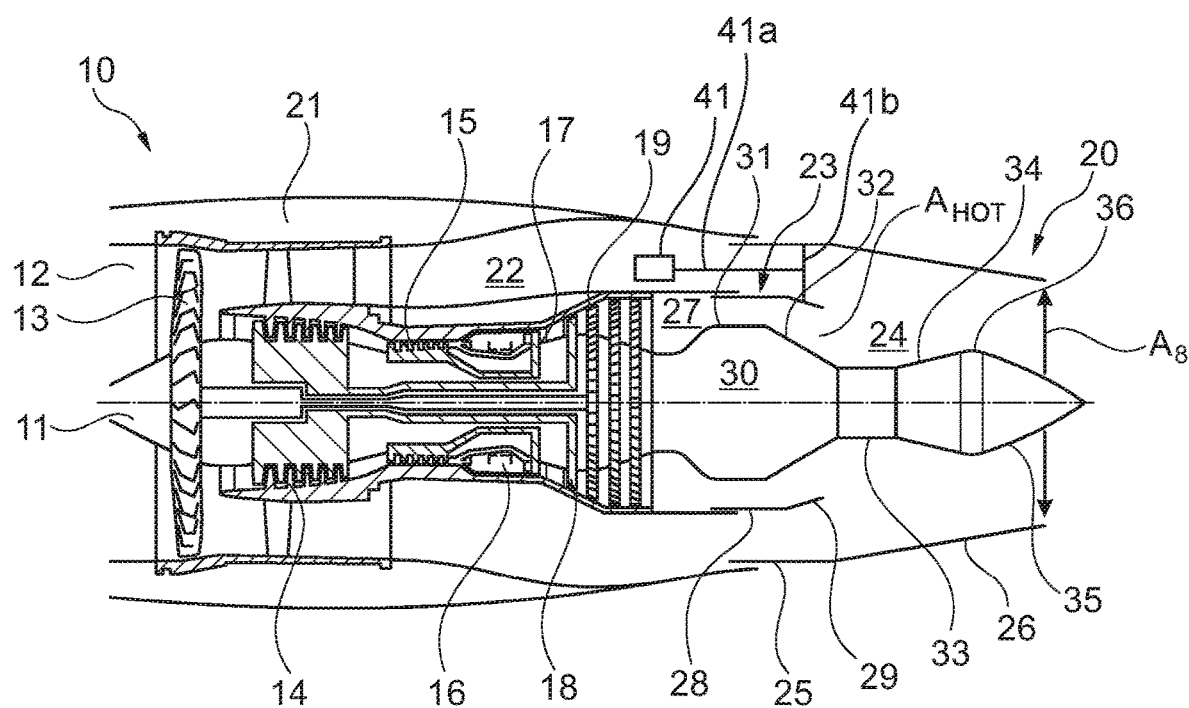
FIG. 1 is a sectional side view of a first embodiment of a gas turbine engine with the nozzle assembly in a first (downstream) position.
Figure 2:
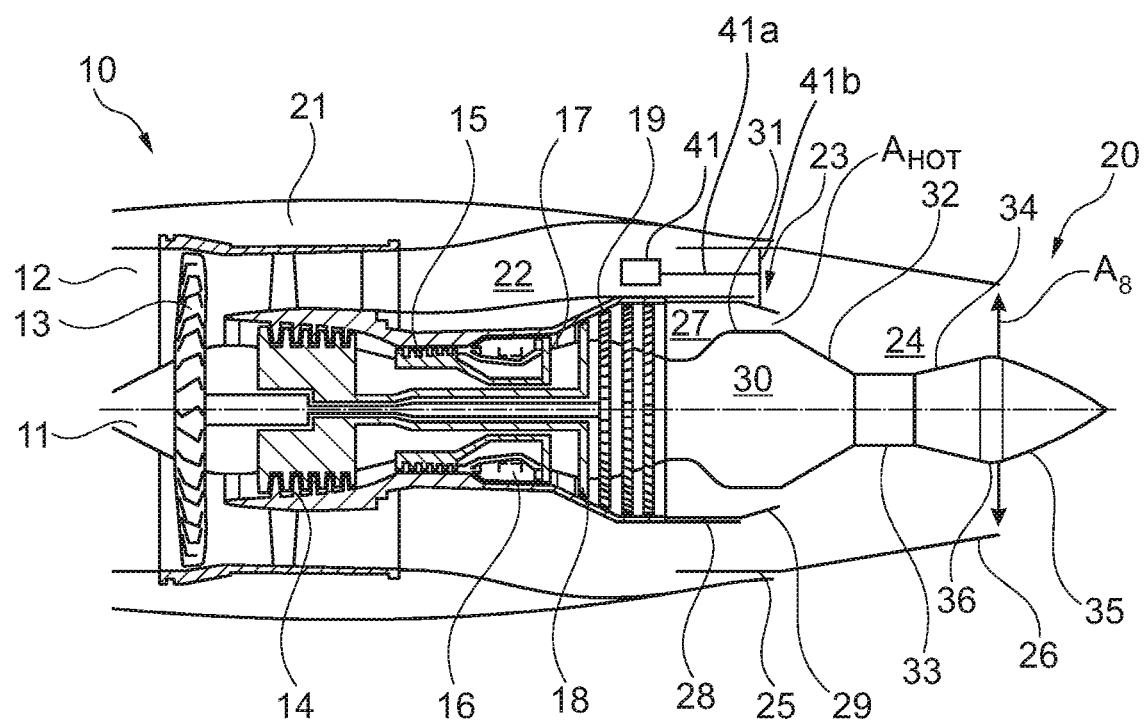
FIG. 2 is a sectional side view of the first embodiment with the nozzle assembly in a second (upstream) position.

With reference to FIGS. 1 and 2, a gas turbine engine is generally indicated at 10, having a principal and rotational axis 11, also known as a centre axis. The gas turbine engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

As discussed above, the gas turbine engine 10 works in the conventional manner so that air entering the intake 12 is accelerated by the fan 13 to produce two air flows: a core flow into the intermediate pressure compressor 14 and a bypass flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The exhaust nozzle assembly shown in FIG. 1 comprises a radially inner mixer nozzle 23 and the radially outer exhaust nozzle 20. The exhaust nozzle 20 extends axially downstream of the mixer nozzle 23.

The exhaust nozzle 20 defines the radially outer periphery of an exhaust duct 24 and at its downstream axial end, defines the radially outer periphery of an exhaust exit area $A_8$.

The exhaust nozzle 20 comprises an annular mounting portion 25 and an axially-translatable converging exhaust cowl 26. The mounting portion 25 is slidably mounted on the nacelle 21

The mixer nozzle 23 defines the radially outer periphery of a core flow duct 27 and at its downstream axial end, defines the radially outer periphery of a core exit area $A_{HOT}$. The core exit area $A_{HOT}$ forms part of a mixing plane where hot core flow from the engine core and cooler bypass flow from the bypass duct 22 mix.

The mixer nozzle 23 comprises an annular mounting portion 28 and an axially-translatable converging mixer cowl 29. The mounting portion 28 is slidably mounted on a static portion of the engine core. The mixer cowl 29 may comprise lobes or chutes (not shown) to facilitate mixing of the core flow and the bypass flow at the mixing plane.

The assembly further comprises a centre-body 30 axially mounted within and extending axially downstream from the mixer nozzle 23.

The centre-body 30 has an axial variation in its diameter/radial cross-section i.e. the diameter/radial cross-section varies from its upstream end to its downstream end.

The centre-body comprises, in an axial downstream direction, an annular mounting portion 31 mounted to a static engine core structure, a converging portion 32 converging from the mounting portion 31 to an annular waist portion 33. The waist portion has the smallest diameter along the centre-body. The waist portion is connected to a downstream head portion comprising a diverging portion 34 (diverging from the waist portion) and a converging end portion 35 which is conical. The plane of deflection 36 between the diverging head portion 34 and converging end portion 35 is the maximum diameter portion of the head portion.

The centre-body 30 defines the radially inner periphery of the (annular) core flow duct 27 and of the (annular) exhaust duct 24.

In the first position shown in FIG. 1, the mixer cowl 29 and the exhaust cowl 26 are in a downstream position with the cowls 29, 26 extended away from the engine core.

The core exit area $A_{HOT}$ (at the mixing plane) is axially aligned proximal the waist portion 33 i.e. at the converging portion 32 proximal the waist portion. At this position, the diameter of the core body 30 is approaching a minimum diameter.

The exhaust exit area $A_8$ is axially aligned with the head portion of the centre-body at a portion having a diameter less than the maximum diameter of the head portion i.e. it is aligned with the converging (conical) end portion 35 of the head portion of the centre-body 30.

In this way, the core exit area $A_8$ and exhaust exit area $A_{HOT}$ are maximised since the radial surface area/diameter of the centre-body 30 in each area is reduced/minimised. This decreases the jet velocity and specific thrust to optimise the engine for take-off conditions with reduced engine noise.

In the second position shown in FIG. 2, the mixer cowl 29 and the exhaust cowl 26 are in an upstream position with the exhaust cowl 26 and the mixer cowl 29 retracted towards the engine core.

The core exit area $A_{HOT}$ (at the mixing plane) is axially aligned with the annular mounting portion 31 where the diameter of the core body 30 has a maximum diameter.

The exhaust exit area $A_8$ is axially aligned with the maximum diameter portion of the head portion of the centre-body 30 where the diverging portion 34 deflects to the converging end portion 35.

In this way, the core exit area $A_8$ and exhaust exit area $A_{HOT}$ are minimised since the radial surface area/diameter of the centre-body 30 in each area is increased/maximised. This increases the jet velocity and specific thrust to optimise the engine for cruise conditions.

The mixer cowl 29 and exhaust cowl 26 are both operatively linked to a single actuation mechanism which preferably comprises a liner actuator 41 e.g. a hydraulic piston which effects axial translation of an axial shaft having radial linkages 41b to the mixer cowl 29 and exhaust cowl 26. The radial linkages 41b transfer the axial translation of the axial linkages 41a to the cowls 29, 26.

Figure 3:
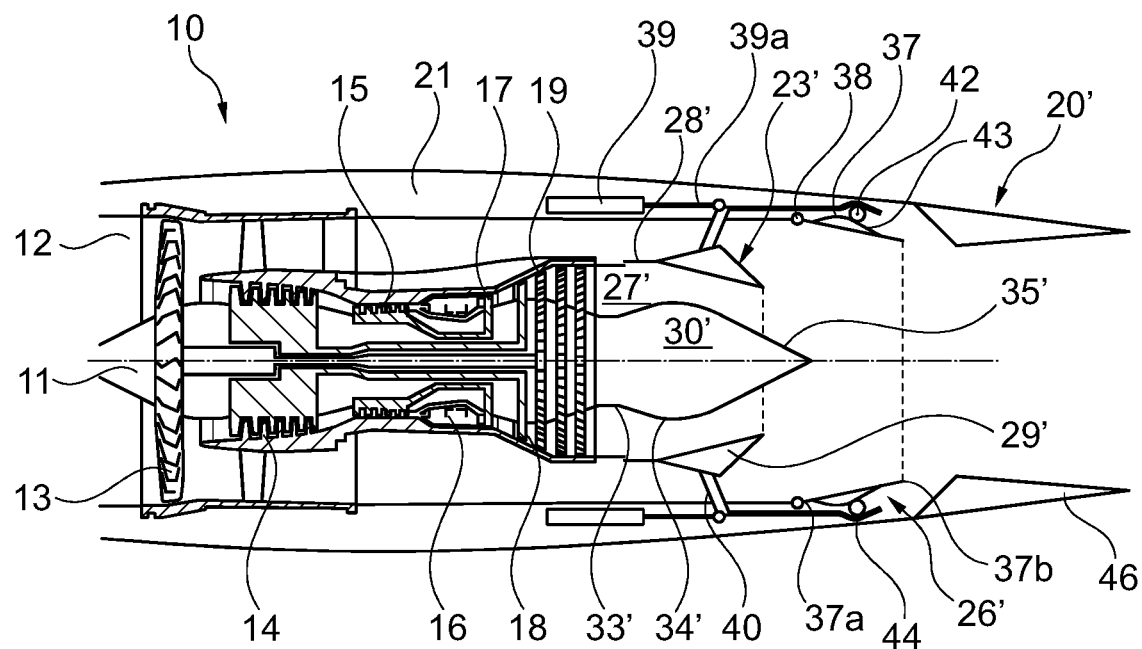
FIG. 3 is a sectional side view of a second embodiment of a gas turbine engine with the nozzle assembly in a first (downstream) position.
Figure 4:
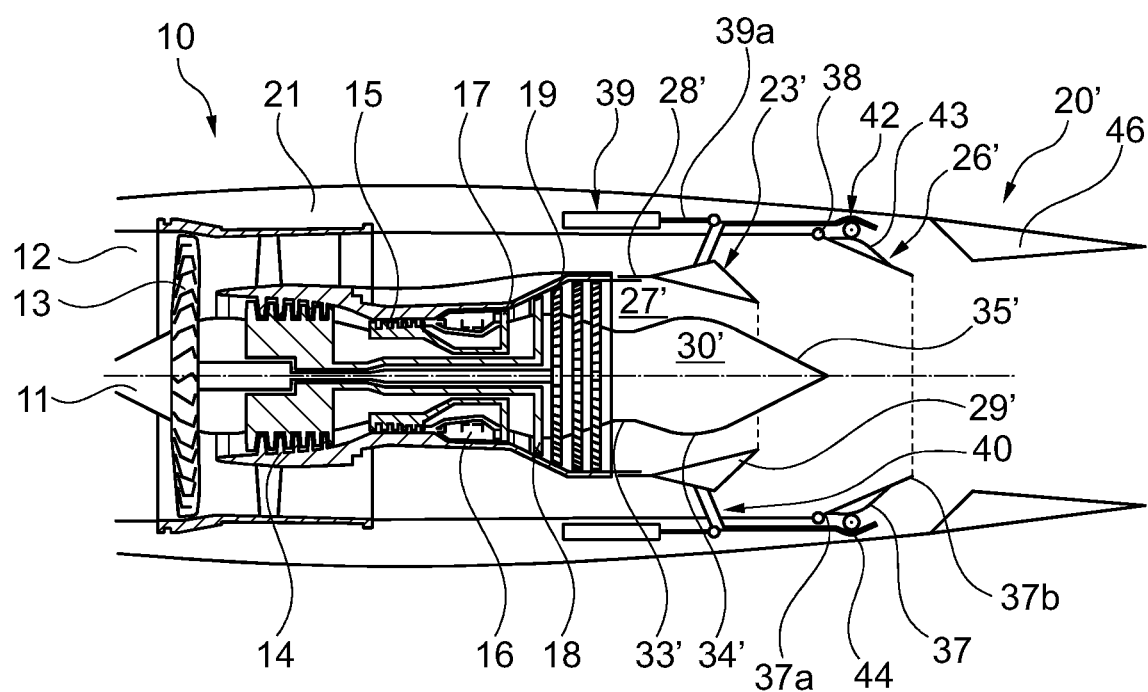
FIG. 4 is a sectional side view of the second embodiment with the nozzle assembly in a second (upstream) position.

FIGS. 3 and 4 show a second embodiment which is as described above for the first embodiment unless otherwise indicated.

Figure 5:
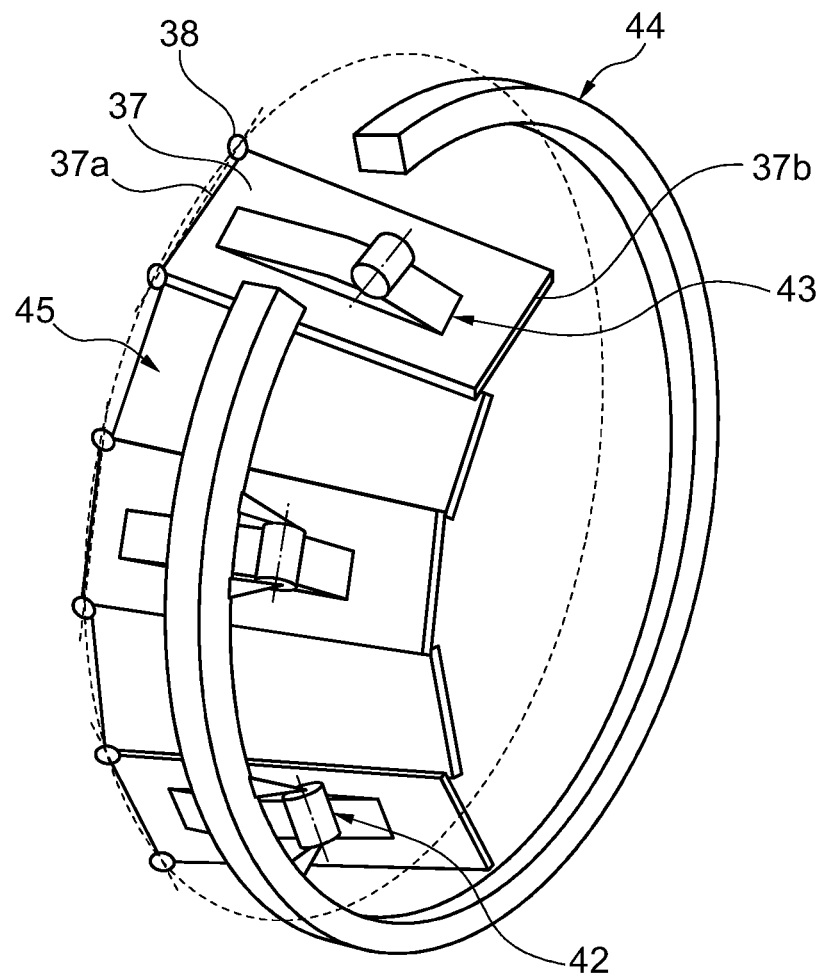
FIGS. 5 and 6a/6b show an angularly adjustable exhaust cowl for use in the second embodiment.

Instead of having an axially-translatable exhaust cowl, the exhaust nozzle 20' in the second embodiment has an angularly-adjustable exhaust cowl 26' comprising a series of circumferentially-arranged cowl petals 37 as shown in FIG. 5, each cowl petal 37 having a fixed upstream end 37a and a free downstream end 37b. The fixed ends 37a are each connected to the nacelle 21 by a respective hinge 38 so that the free ends 37b can pivot towards and away from the centre axis 11 to adjust the angle each cowl petal 37 makes relative to the engine axis 11.

The centre-body 30' is axially mounted within and extends axially downstream from the mounting portion 28' and mixer nozzle 23' towards the exhaust nozzle 20'. However, in the second embodiment, the downstream end of the centre-body 30' terminates prior to the exhaust exit area $A_8$. Thus the centre-body 30' defines the inner periphery of the annular core flow duct 27' but does not impinge on the exhaust exit area $A_8$.

The centre-body 30' comprises, in an axial downstream direction, an annular waist portion 33' which is mounted to a static engine core structure. The waist portion 33' has the smallest diameter along the centre-body 30'. The waist portion is connected to a downstream head portion comprising a diverging portion 34' (diverging from the waist portion 33') and a converging end portion 35' which is conical. The plane of deflection between the diverging head portion 34' and converging end portion 35' is the maximum diameter portion of the head portion/centre-body 30'.

In the first position shown in FIG. 3, the mixer cowl 29' is in a downstream position extended away from the engine core.

The core exit area $A_{HOT}$ (at the mixing plane) is axially aligned with the converging end portion 35' of the head portion of the centre-body 30' proximal the downstream end of the centre-body. At this position, the diameter of the core body 30' is approaching a minimum diameter.

In the first position, the angle of the exhaust cowl 26' relative to the engine axis 11 is small (e.g. less than around 20 degrees) (i.e. the free ends 37b of the cowl petals 37 are remote from the centre axis 11 such that that they are almost parallel to the centre axis).

In this way, the core exit area $A_8$ and exhaust exit area $A_{HOT}$ are maximised since the radial surface area/diameter of the centre-body 30' in the core exit area $A_{HOT}$ is reduced/minimised and the diameter of the exhaust cowl 26' is increased. This decreases the jet velocity and specific thrust to optimise the engine for take-off conditions with reduced engine noise.

In the second position shown in FIG. 4, the mixer cowl 29' is in a downstream position extended away from the engine core.

The core exit area $A_{HOT}$ (at the mixing plane) is axially aligned with the converging end portion 35' of the head portion of the centre-body 30' proximal the deflection 36'. At this position, the diameter of the core body 30' is greater than the diameter of the portion aligned with the core exit area $A_{HOT}$ in the first position.

In the second position, the angle of the exhaust cowl 26' relative to the engine axis 11 is increased (e.g. greater than around 30 degrees) (i.e. the free ends 37b of the cowl petals 37 move towards the centre axis 11).

In this way, the core exit area $A_8$ and exhaust exit area $A_{HOT}$ are minimised since the radial surface area/diameter of the centre-body 30' in the core exit area $A_{HOT}$ is increased/maximised and the diameter of the exhaust cowl 26' is decreased. This increases the jet velocity and specific thrust to optimise the engine for cruise conditions.

The mixer cowl 29' and exhaust cowl 26' are both operatively linked to a single actuation mechanism which comprises a plurality of circumferentially-arranged linear actuators 39 (e.g. hydraulic or pneumatic pistons or screw jacks) each connected to a respective axial shaft 39a having a radial linkage 40 to the mixer cowl 29'. The radial linkages 40 transfer the axial translation of the axial shaft 39a to the cowl 29'.

The actuation mechanism also comprises a plurality of rollers 42 each seated on a respective radially outer cam surface 43 of an exhaust petal 37 as shown in FIG. 5. The rollers 42 are coupled to a unison ring 44 surrounding the radially outer surface of the cowl petals 37, the unison ring 44 being connected to the axial shafts 39a.

Figure 6A:
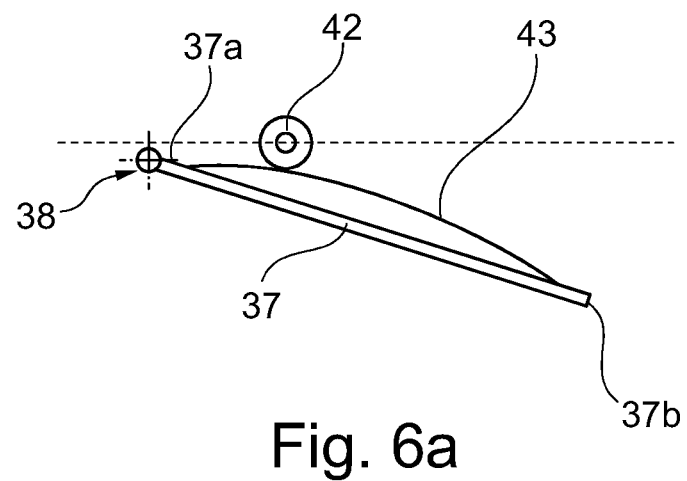
Figure 6B:
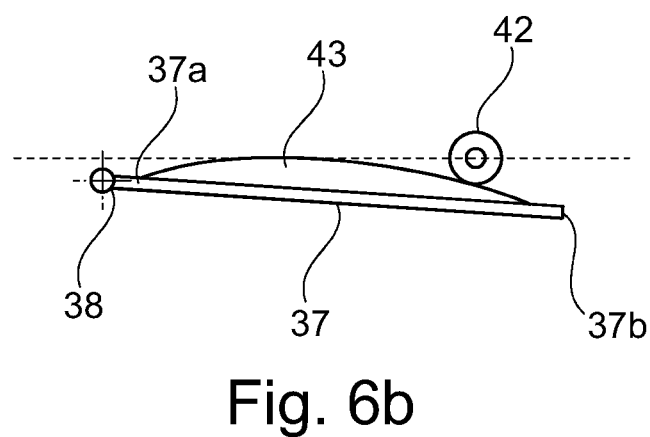

As can be seen in FIGS. 6a and 6b, when a roller 42 is in an upstream (second) position (FIG. 6a) on the respective cam surface 43, the free end 37b of the cowl petal 37 is forced towards the centre axis 11 of the engine thus reducing the exhaust exit area $A_8$.

Actuation of the hydraulic pistons causes the rollers 42 to move axially over/down the cam surface 43 to a downstream (first) position (FIG. 6b) to allow the free end 37b of the associated cowl petal 37 to move away from the engine centre axis 11 thus increasing the area of the exhaust exit area $A_8$.

The unison ring 44 ensures that all cowl petals 37 associated with a roller 42 move to the same extent at the same time i.e. move in unison. As can be seen in FIG. 5, not all cowl petals 37 require an associated roller 42 and cam surface 43. Those without a roller 42 and cam surface 43 are slave petals 45 which will be forced to move by the master petals with the rollers 42 and cam surfaces 43.

The nozzle assembly shown in FIGS. 3 and 4 further comprises a divergent section 46 downstream of the exhaust nozzle. This divergent section may have a fixed or variable geometry.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An exhaust nozzle assembly for a gas turbine engine having a centre axis, said assembly comprising:
   a concentrically arranged inner mixer nozzle and outer exhaust nozzle, the exhaust nozzle extending axially downstream of said mixer nozzle,
   a centre-body axially mounted within and extending axially downstream of the mixer nozzle;
   a core flow duct defined by the mixer nozzle and the centre-body, the core flow duct having a core exit area;
   an exhaust duct defined at least in part by the exhaust nozzle downstream of the mixer nozzle, the exhaust duct having an exhaust exit area; and
   an actuation mechanism;
   wherein the mixer nozzle comprises a mixer cowl which defines the core exit area and is axially-translatable along the centre axis and wherein the exhaust nozzle comprises an exhaust cowl which defines the exhaust exit area and is either axially-translatable along or angularly-adjustable relative to the centre axis; and
   wherein the mixer cowl and the exhaust cowl are movable by the actuation mechanism between a first position in which the core exit area and the exhaust exit area are maximum and a second position in which the core exit area and the exhaust exit area are minimum.

2. The exhaust nozzle assembly according to claim 1 where the mixer cowl comprises a mounting portion and a convergent portion converging from the mounting portion.

3. The exhaust nozzle assembly according to claim 1 wherein the mixer nozzle is a lobed/chute mixer nozzle.

4. The exhaust nozzle assembly according to claim 1 wherein the centre-body comprises, in an axial downstream direction, a waist portion and a head portion, the head portion comprising in the axial downstream direction, a diverging portion and a converging end portion, the centre-body optionally further comprising an axially upstream convergent portion converging to the waist portion from an axially upstream mounting portion.

5. The exhaust nozzle assembly according to claim 1 wherein the first position of the mixer cowl is a downstream position with the mixer cowl extended in a downstream direction and the second position of the mixer cowl is an upstream position with the mixer cowl retracted in an upstream direction.

6. The exhaust nozzle assembly according to claim 1 wherein, in the first position, the core exit area is axially aligned with the centre-body at a portion having a diameter less than the maximum diameter of the centre-body and, in the second position, the core exit area is axially aligned with the centre-body at a portion having a diameter greater than the minimum diameter of the centre-body.

7. The exhaust nozzle assembly according to claim 6 wherein, in the first position, the core exit area is axially aligned with:
   a) a waist portion of the centre-body; or
   b) a converging portion upstream of the waist portion.

8. The exhaust nozzle assembly according to claim 6 wherein, in the second position, the core exit area is axially aligned with:
   a) a mounting portion of the centre-body; or
   b) a converging portion downstream of the mounting portion.

9. The exhaust nozzle assembly according to claim 1 wherein the exhaust cowl comprises a mounting portion and a convergent portion converging from the mounting portion.

10. The exhaust nozzle assembly according to claim 1 wherein the first position of the exhaust cowl is a downstream position with the exhaust cowl extended in a downstream direction and the second position of the exhaust cowl is an upstream position with the exhaust cowl retracted in an upstream direction.

11. The exhaust nozzle assembly according claim 1 wherein when the exhaust cowl is in the first position, the exhaust exit area is axially aligned with the centre-body at a first portion having a diameter less than the maximum diameter of the centre-body and, in the second position, the exhaust exit area is axially aligned with the centre-body at a portion having a greater diameter than in the first portion.

12. The exhaust nozzle assembly according to claim 1 wherein the exhaust cowl comprises a series of circumferentially-arranged cowl petals, each of the cowl petals having a fixed upstream end and a free downstream end wherein the free ends can pivot/hinge about their respective fixed ends to adjust the angle each cowl petal makes relative to the engine axis.

13. The exhaust nozzle assembly according to claim 1 wherein the actuator mechanism is configured to move/adjust both the mixer cowl and the exhaust cowl in unison between the first and second positions.

14. The exhaust nozzle assembly according to claim 1 wherein the actuator mechanism comprises a plurality of circumferentially-arranged linear actuators.

15. The exhaust nozzle assembly according to claim 14 wherein each actuator of the plurality of circumferentially-arranged linear actuators comprises at least one axial linkage.

16. The exhaust nozzle assembly according to claim 15 wherein the actuation mechanism comprises a radial linkage extending from the at least one axial linkage to the mixer cowl.

17. The exhaust nozzle assembly according to claim 16, wherein the actuation mechanism comprises one or more rollers each seated on a respective radially outer cam surface of the exhaust cowl, at least one roller of the one or more rollers being connected directly or indirectly to a respective one of the at least one axial linkage.

18. A gas turbine engine having an exhaust nozzle assembly according to claim 1.

19. A supersonic aircraft having a gas turbine engine according to claim 18.

* * * * *